US012676055B2

(12) United States Patent
Goodwin et al.

(10) Patent No.: US 12,676,055 B2
(45) Date of Patent: Jul. 7, 2026

(54) DISRUPTED CUSTOMER INTERACTION METRIC

(71) Applicant: Bank of America Corporation, Charlotte, NC (US)

(72) Inventors: James Goodwin, Holt, MO (US); Deacon Arokoyo, O'Fallon, MO (US); Jesse Wood, Mesa, AZ (US); Andy Pressnall, Highland, IL (US); Jay Newell, St. Charles, MO (US); Alex Fuentes, O'Fallon, MO (US); Amisha Pandey, New Delhi (IN); Gregory Duez, O'Fallon, MO (US); Brady Kaughdrill, Lewisville, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/244,333

(22) Filed: Sep. 11, 2023

(65) Prior Publication Data

US 2025/0087066 A1 Mar. 13, 2025

(51) Int. Cl.
*G07F 19/00* (2006.01)

(52) U.S. Cl.
CPC .................................. *G07F 19/209* (2013.01)

(58) Field of Classification Search
None
See application file for complete search history.

(56) References Cited

U.S. PATENT DOCUMENTS

| | | | | |
|---|---|---|---|---|
| 5,392,095 | A * | 2/1995 | Siegel | H04N 1/32561 399/81 |
| 6,964,368 | B1 * | 11/2005 | Trelawney | G07F 19/20 235/375 |
| 7,545,816 | B1 * | 6/2009 | Coutts | G07G 1/14 235/375 |
| 8,015,271 | B2 * | 9/2011 | McKeown | G06F 9/46 709/226 |
| 8,078,485 | B1 * | 12/2011 | Kraehmueller | G06Q 10/063 705/7.29 |
| 8,589,731 | B1 * | 11/2013 | Munson | G06F 11/1438 714/15 |
| 2002/0116148 | A1 * | 8/2002 | Bertsch | G05B 23/0283 702/184 |
| 2003/0163440 | A1 * | 8/2003 | Tonack | G05B 23/0283 |

(Continued)

*Primary Examiner* — William J Jacob

(74) *Attorney, Agent, or Firm* — Weiss & Arons LLP

(57) ABSTRACT

Systems and methods are provided for categorizing a plurality of customer interactions. The systems and methods include monitoring the plurality of customer interactions for incidents at a plurality of user interfaces. The systems and methods include recording the incidents. The systems and methods include identifying a respective time and location in which each incident occurred. The systems and methods include determining the existence of secondary user interfaces at the respective location for each incident. The systems and methods include determining the operability of each respective secondary user interface during the respective time for each incident. The systems and methods include categorizing each incident as either a failed customer interaction ("FCI") or disrupted customer interaction ("DCI"). The systems and methods include placing the FCIs into an FCI bucket and the DCIs into a DCI bucket.

9 Claims, 5 Drawing Sheets

(56) References Cited

U.S. PATENT DOCUMENTS

2008/0270329 A1* 10/2008 Long ...................... G06N 20/00 706/12
2010/0318233 A1* 12/2010 Yunes ................ G05B 23/0283 700/287
2010/0318837 A1* 12/2010 Murphy .............. G06F 11/1461 714/E11.125
2014/0046911 A1* 2/2014 Roomp ............... G06F 16/2365 707/E17.002
2017/0006135 A1* 1/2017 Siebel ...................... H04L 67/10
2017/0026291 A1* 1/2017 Smith ...................... H04L 45/22
2017/0094503 A1* 3/2017 Iannce ............... H04N 1/32101
2018/0074886 A1* 3/2018 Ewington ............. G07F 19/206
2018/0096309 A1* 4/2018 Moses ..................... G06F 16/24
2019/0172021 A1* 6/2019 Watson .................. G06Q 40/02
2020/0020356 A1* 1/2020 Smith .................... H04N 5/772
2021/0224265 A1* 7/2021 Madan ................... G06N 20/00
2022/0070697 A1* 3/2022 Eleftheriadis ......... H04W 24/02
2025/0217776 A1* 7/2025 Kuriyama .......... G06Q 10/1097

* cited by examiner

FCI
(Failed Customer Interaction)

FCI
(Failed Customer Interaction)

DCI
(Disrupted Customer Interaction)

DISRUPTED CUSTOMER INTERACTION METRIC

FIELD OF TECHNOLOGY

Aspects of the disclosure relate to technology for customer interaction metrics.

BACKGROUND OF THE DISCLOSURE

Customers having accounts at financial institutions may need to interact with the financial institution in order to conduct business or transactions with the financial institution. In order to interact with customers financial institutions may have financial centers to assist customers with transactions. The financial centers may have user interfaces including teller windows and/or automated teller machines ("ATM") assisting customers.

Currently customer interactions at user interfaces may be tracked. Customer interactions may be categorized as failed customer interactions ("FCI"). An FCI leaves the customer dissatisfied. An FCI may occur due to down ATMs or closed teller windows. FCI may be tracked when an ATM fails to conclude a transaction.

The FCI metric may not form a complete picture of the customer's interaction. A customer may fail to conclude a transaction at one ATM but may be able to conclude the transaction at a nearby ATM or teller window. The first failed interaction may leave the customer dissatisfied but the customer will still be able to complete the transaction at the same location.

Therefore, it would be desirable to create a new metric to incorporate location into determining an FCI. It would be further desirable to create a new categorization of customer interactions for disrupted customer interactions. It would be further desirable to utilize the disrupted customer interactions in performing maintenance.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout.

DETAILED DESCRIPTION OF THE DISCLOSURE

Figure 1:
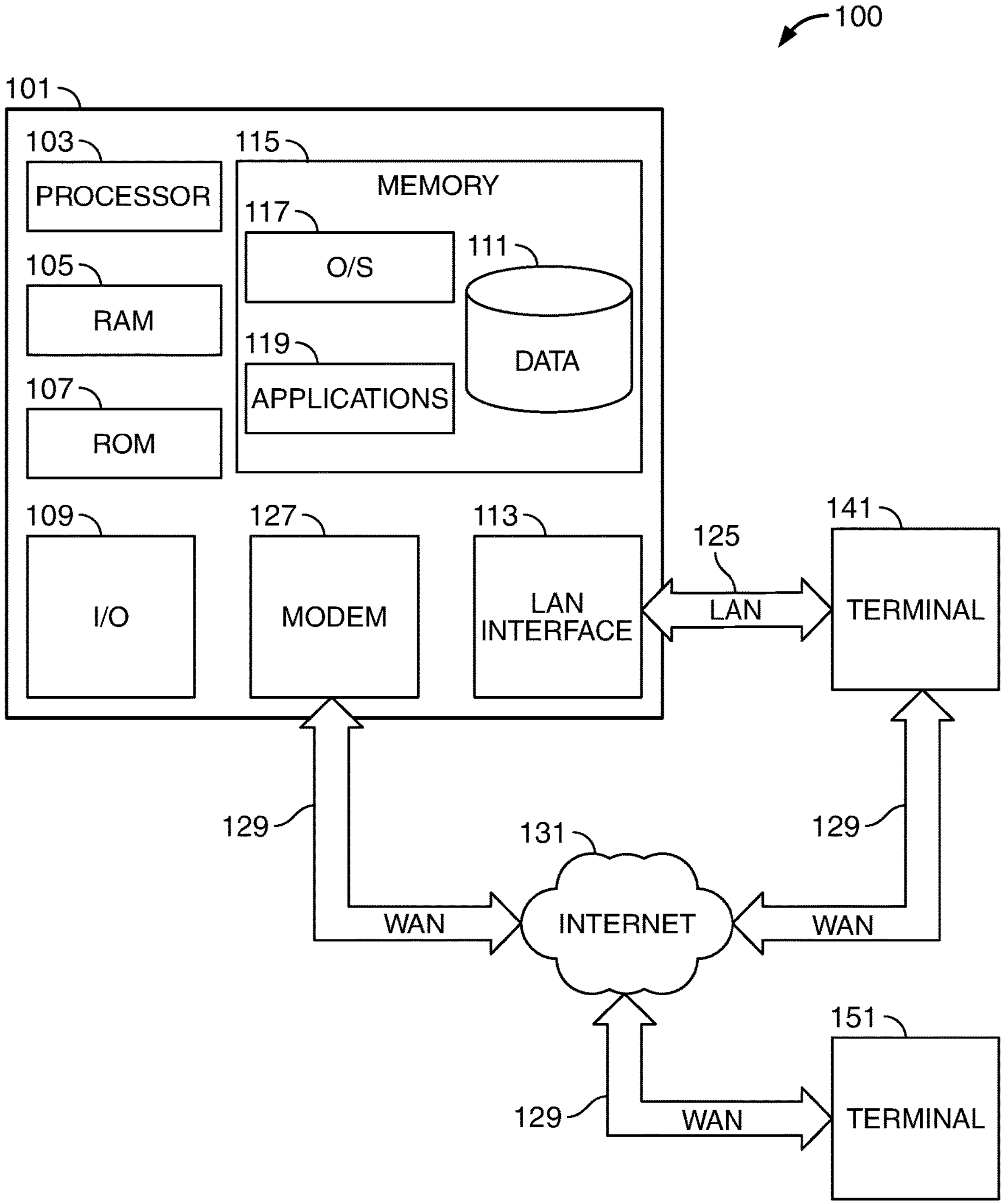
FIG. 1 shows an illustrative apparatus in accordance with principles of the disclosure.

Systems and methods are provided for categorizing a plurality of customer interactions at a plurality of user interfaces. Systems and methods are provided for prioritizing maintenance at a plurality of user interfaces.

A financial institution may have financial centers. The financial centers may have user interfaces to allow customers to conduct transactions at the financial centers. The financial centers may include teller windows. The financial centers may include ATMs. The financial centers may have any suitable number of teller windows and ATMs.

The financial centers may monitor user interactions for incidents. The financial institutions may monitor user interactions for incidents. All incidents may be monitored from one or more central locations. Each user incident may be monitored from their respective financial center and sent to one or more central locations. Each central location may include one or more computer systems. Each computer system may include one or more computers. Each computing system may include one or more servers. Each computing system may include one or more databases. Each computer system may be capable of receiving incident reports. Each computer system may be capable of processing and analyzing the incident reports. Each computer may include one or more of a monitor, a processor, a memory and a receiver for receiving incident reports.

The systems and methods may include categorizing a plurality of customer interactions. The plurality of customer interactions may be monitored for incidents. Each customer interaction may take place at a respective user interface of a plurality of user interfaces. The user interfaces may include ATMs or teller windows. The ATMs and teller windows may electronically record the incidents in incident reports. The incident reports may be sent to the central location. The incidents may be reported when a customer interaction is not completed.

Incidents may include a jam in the cash dispenser of an ATM, a communication issue with the respective user interface, a host issue with the respective user interface, an encryption issue with the respective user interface, a card reader issue in the respective user interface, a printer issue with the respective user interface, insufficient cash in the respective user interface, a cash depositor is full in the respective user interface and/or any other issue which would prevent a user interface from completing a transaction. The communication issue may include the user interface not connecting to the internet, or the user interface being powered off. The host issue may include the user interface not syncing with the central computer system.

The systems and methods may include identifying a respective location of each incident and a respective time in which each incident occurred. The incident report may include the respective time in which the incident occurred. The incident report may include an identification number of the user interface at which the incident occurred. The identification number may be stored in a lookup table stored in a database. The identification number may be associated, in the lookup table, with a location in which the user interface is located.

The systems and methods may include determining the existence of secondary user interfaces at each respective location for each incident. Determining the existence of secondary user interfaces may include looking up the location where the incident occurred in a lookup table stored in a database. The location may be associated with all of the user interfaces in the location. The location being associated with more than one user interface indicates the existence of secondary user interfaces.

The systems and methods may include determining an operability of each respective secondary user interface during the respective time for each incident. Operability of a secondary ATM may be determined by parsing all incident reports during the respective time to determine whether the secondary ATM had an incident. Operability of a secondary ATM may be determined by looking up whether there is any scheduled maintenance or updates being performed on the secondary ATM during the respective time. Operability of a teller window may be determined by looking up whether the teller window is open during the respective time. Operability of a teller window may be determined by looking up whether there were any electronically reported teller window closings during the respective time.

The systems and methods may include categorizing each incident as either a failed customer interaction ("FCI") or a disrupted customer interaction ("DCI"). The categorizing an incident as an FCI may include determining that either the respective secondary user interfaces do not exist or all of the secondary user interfaces are inoperable during the respective time. The categorizing an incident as a DCI may include determining that the respective secondary user interfaces exist and at least one of the respective secondary user interfaces is operable during the respective time.

The systems and methods may include placing incidents categorized as an FCI into a failed customer interaction bucket. The systems and method may include placing incidents categorized as a DCI into a disrupted customer interaction bucket. The FCI and DCI buckets may be analyzed.

The analysis may include how many incidents are occurring during a specific time period. The analysis may include how often incidents are occurring in a specific user interface and across all user interfaces. The analysis may include tracking the operability of the user interfaces. Tracking the operability may include tracking how long an incident lasts. Tracking the operability may include tracking how many of each type of incident occurs.

The analysis may be used to identify change in the operability of the user interface. For example, a new software may be deployed to a large number of user interfaces. The deployment may be rolled out to a smaller number of user interfaces at the start. FCI or DCI occurring at those user interfaces can be analyzed to determine whether the rollout was successful or whether the new software has bugs or defects. In this way when deploying a new software, some customer impact can be avoided.

The analysis may be used to manage availability. FCI or DCI data may be used to determine which user interfaces should receive maintenance and in what order. FCI and DCI data may be used to determine chronic problems in the same user interface. FCI and DCI data may be used to track and trend user interface availability over time.

Incidents may be resolved by deploying vendors to resolve incidents at user interfaces. Incidents may be categorized into different types of incidents. The different types of incidents may be hardware, software, cash or maintenance incidents. Different vendors may be deployed for each type of incident. For example, armored vendors may be deployed for cash type incidents. Deploying vendors may be prioritized based on how many operable secondary user interfaces exist at the respective location of the user interface on which maintenance will be performed. DCI may be prioritized over FCI.

The systems and methods for prioritizing performing maintenance on a plurality of user interfaces may include identifying a first group of user interfaces on which to perform maintenance or resolve an incident. The first group may be identified by the central computer system. Members of the first group may be identified by determining whether there is an incident at the user interface. Members of the first group may be identified by determining whether scheduled maintenance is required. Scheduled maintenance may include cleaning the user interface, emptying the cash from a user interface and/or installing new hardware/software.

The systems and methods for prioritizing performing maintenance may include identifying a respective location of each user interface of the first group of user interfaces. Each user interface may be associated with an identification number. The identification number may be stored in a lookup table stored in a database. The identification number may be associated with a respective location in the lookup table. The respective location of each user interface may be identified by using the lookup table to lookup the respective location associated with each user interface.

The systems and methods for prioritizing performing maintenance may include determining the existence of one or more secondary user interfaces at the respective location of each user interface of the first group of user interfaces. Determining the existence of secondary user interfaces may include looking up the respective location where the incident occurred in a lookup table stored in a database. The respective location may be associated with all of the user interfaces in the location. The respective location being associated with more than one user interface indicates the existence of secondary user interfaces.

The systems and methods for prioritizing performing maintenance may include determining an operability of each respective secondary user interface during a planned maintenance time. Operability of a secondary ATM may be determined by parsing all incident reports to determine whether the secondary ATM is having an incident during the planned maintenance time. Operability of a secondary ATM may be determined by looking up whether there is any scheduled maintenance or updates being performed on the secondary ATM during the planned maintenance time. Operability of a teller window may be determined by looking up whether the teller window is open during the respective time. Operability of a teller window may be determined by looking up whether there are any electronically reported teller window closings during the planned maintenance time.

The systems and methods for prioritizing performing maintenance may include ranking each user interface of the first group of user interfaces. The ranking may be based on the amount of operable respective secondary user interfaces associated with each user interface. The user interface with the least amount of respective secondary user interfaces may receive the lowest ranking. The maintenance may be performed on the user interfaces with the lowest ranking first.

Respective user interfaces that receive the same rank may be prioritized based on the average number of customer interactions completed at the respective user interface in a twenty-four-hour period. The user interface with the highest number of average customer interactions may receive the highest priority. The maintenance may be performed on the user interface with the lowest rank and the highest priority first.

In some embodiments, the user interface with the least amount of respective secondary user interfaces may receive the highest ranking. The maintenance may be performed on the user interfaces with the highest ranking first.

The maintenance may be performed during a time period when the average number of customer interactions per hour is the least. Other factors may be taken into account when prioritizing maintenance. The other factors may include how long it has been since maintenance was performed on the user interface, proximity of the user interface to another user interface on which maintenance is being performed and/or a type of incident that occurred at the user interface.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computer system" or "computing device." Elements of apparatus 100, including computer 101, may be used to implement various aspects of the systems and method disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101, e.g., the operating system 117 and applications 119 such as an automatic data layering program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an automatic data layering program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth®, wi-fi, cellular networks, or other suitable frequencies.

Any memory may be comprised of any suitable permanent storage technology—e.g., a hard drive or other non-transitory memory. The memory may store software including an operating system and any application(s) (such as an automatic data layering program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refers to applications located on a server remote from a user, wherein some or all the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth®, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an automatic data layering program and security protocols, as well as other programs. In an embodiment, one or more programs, or aspects of a program, may use one or more AI/ML algorithm(s). The various tasks may be related to analyzing and categorizing various data to layer the data according to levels of access.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
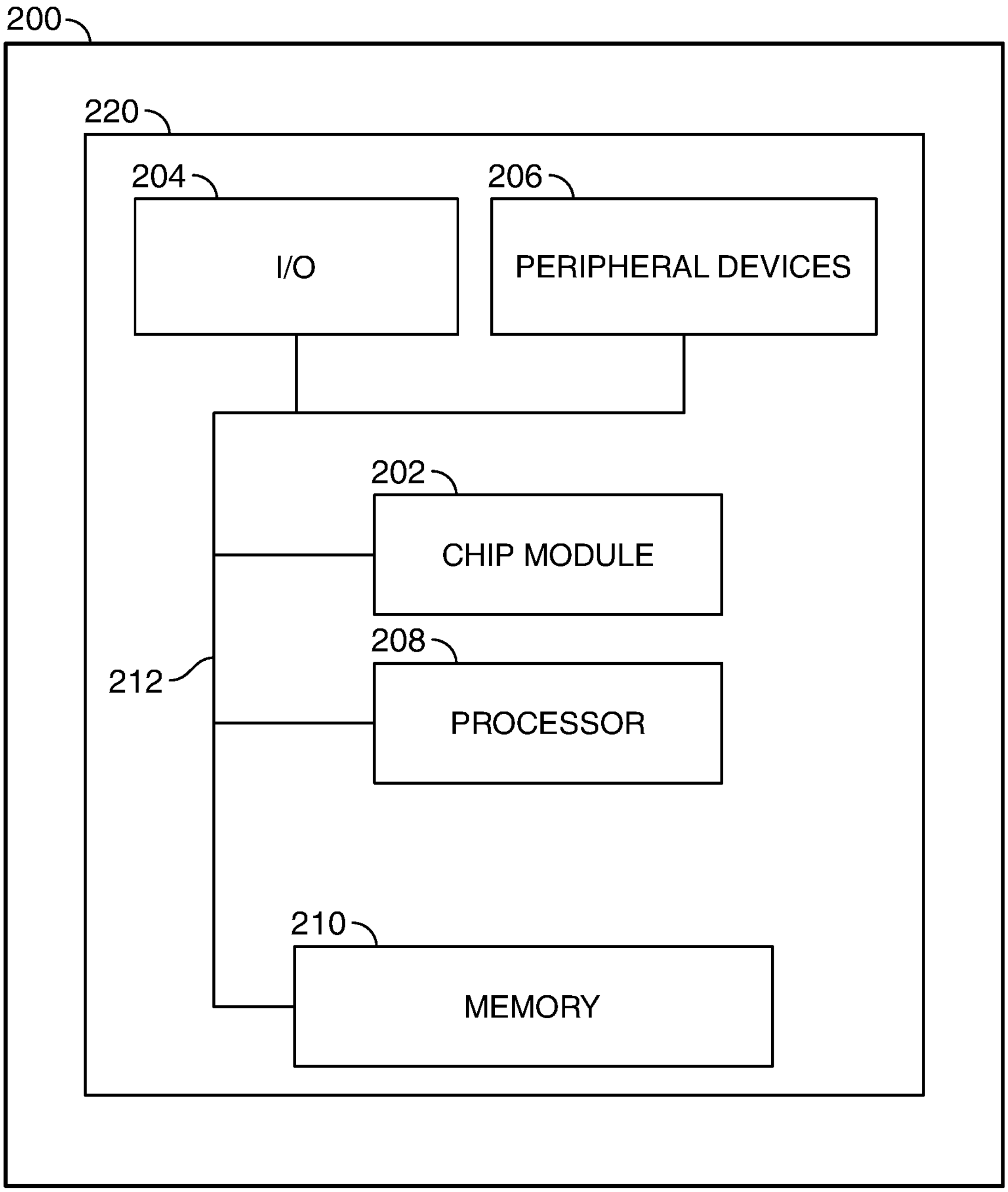
FIG. 2 shows another illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
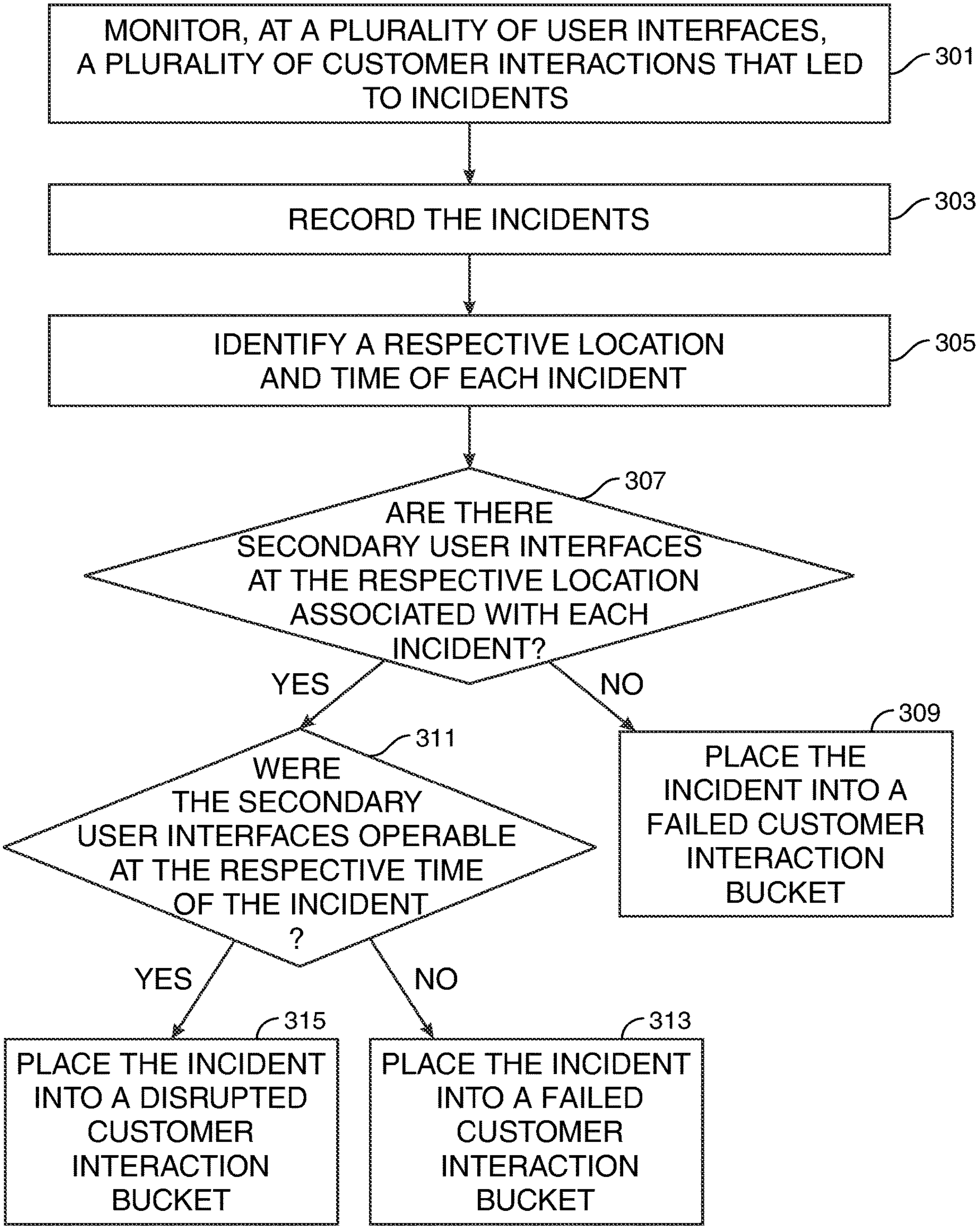
FIG. 3 shows an illustrative flowchart in accordance with principles of the disclosure.

FIG. 3 shows an illustrative flowchart in accordance with principles of the disclosure. At step 301, methods may include monitoring a plurality of customer interactions for incidents at a plurality of user interfaces. At step 303, methods may include recording the incidents. At step 305, methods may include identifying a respective location and time of each incident. At step 307, methods may include determining whether there are other user interfaces at the respective location for each incident. When it is determined that there are no other user interfaces at the respective location for an incident the flow goes to step 309 and the incident is placed into a failed customer interaction bucket. When there are other user interfaces at the respective location for an incident the flow goes to step 311. At step 311 it is determined whether the other user interfaces were operable at the respective time of the incident. When it is determined that the other user interfaces were not operable at the time of the incident the flow goes to step 313 and the incident is placed into a failed customer interaction bucket. When it is determined that at least one of the other user interfaces were operable at the time of the incident the flow goes to step 315. At step 315 the incident is placed into a disrupted customer interaction bucket.

Figure 4:
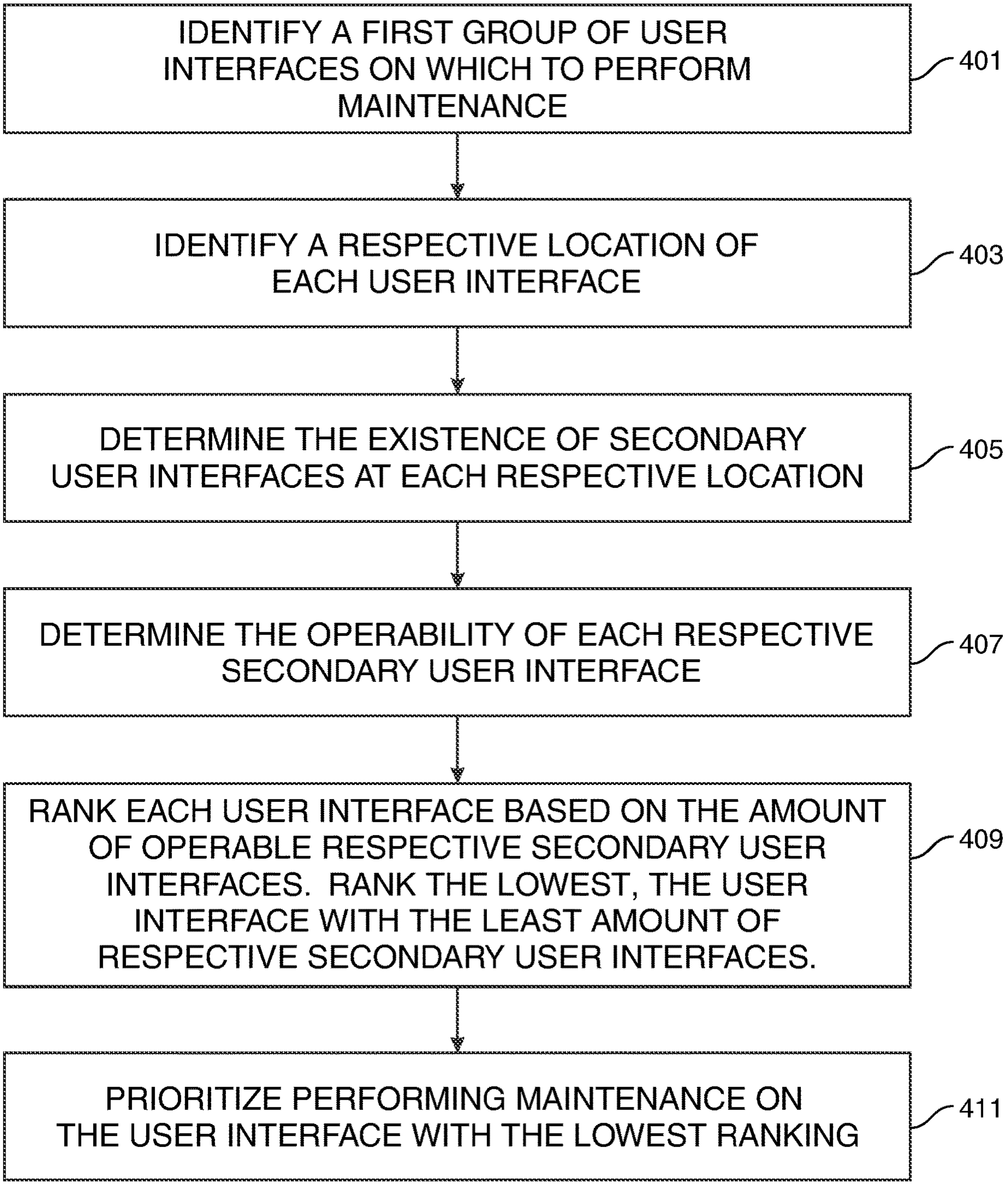
FIG. 4 shows another illustrative flowchart in accordance with principles of the disclosure.

FIG. 4 shows an illustrative flowchart in accordance with principles of the disclosure. At step 401, methods may include identifying a first group of user interfaces on which to perform maintenance. At step 403, methods may include identifying a respective location of each user interface. At step 405, methods may include determining the existence of secondary user interfaces at each respective location. At step 407, methods may include determining the operability of each respective secondary user interface. At step 409, methods may include ranking each user interface based on the amount of operable respective secondary user interfaces. The user interface with the least amount of respective secondary user interfaces receives the lowest ranking. At step 411, methods may include prioritizing performing maintenance on the user interface with the lowest ranking.

Figure 5:
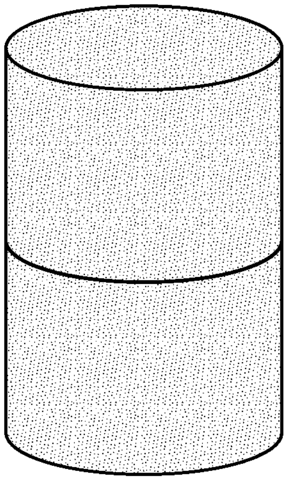
FIG. 5 PRIOR ART
FIG. 5 shows a prior art diagram.

FIG. 5 shows a prior art diagram. FIG. 5 shows a prior art scenario in which all incidents are categorized as FCI. The FCI may be placed within a failed customer interaction bucket.

Figure 6:
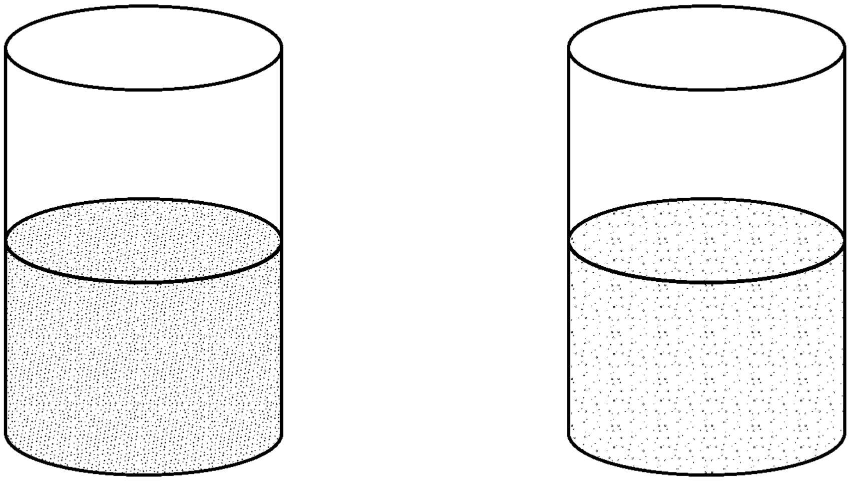
FIG. 6 shows another illustrative diagram in accordance with principles of the disclosure.

FIG. 6 shows an illustrative diagram in accordance with principles of the disclosure. FIG. 6 shows a scenario in which all incidents are categorized into FCI and DCI. The incidents are placed within their respective buckets.

The systems and method may include performing the scenarios in FIG. 5 and FIG. 6 simultaneously. The difference between the number of FCI in the scenario of FIG. 5 may be compared to the number of FCI in the scenario of FIG. 6 to determine the effectiveness of categorizing incidents differently.

Thus, systems and methods for DISRUPTED CUSTOMER INTERACTION METRIC have been provided. Persons skilled in the art will appreciate that the present invention can be practiced by other than the described embodiments, which are presented for purposes of illustration rather than of limitation, and that the present invention is limited only by the claims that follow.

What is claimed is:

1. A method for categorizing a plurality of customer interactions as either a failed customer interaction ("FCI") or a disrupted customer interaction ("DCI"), the method comprising:

monitoring, from a central location including one or more computer systems, the plurality of customer interactions for incidents, each customer interaction taking place at a respective user interface of a plurality of user interfaces;

electronically recording the incidents at an autonomous teller machine ("ATM"), the electronic recording generating an incident report;

transmitting, via a server, the incident report to the central location;

analyzing, at the central location, the incident report to identify:

a respective location of each incident;

a respective time in which each incident took place;

determining the existence of secondary user interfaces at the respective location for each incident;

determining an operability of each respective secondary user interface during the respective time for each incident, said determining an operability of each respective secondary user interface comprising:

parsing all incident reports during the respective time to determine whether each secondary user interface had an incident;

determining whether there is any scheduled maintenance being performed on each secondary user interface during the respective time; and determining whether there are any scheduled updates being performed on each secondary user interface during the respective time;

categorizing each incident as either a failed customer interaction ("FCI") or a disrupted customer interaction ("DCI");

placing the FCIs into a failed customer interaction bucket;

placing the DCIs into a disrupted customer interaction bucket;

analyzing, at the central location, the FCI bucket and the DCI bucket, wherein the analyzing comprises:

determining a number of incidents that occur during a specific time period;

determining a number of incidents that occur in the respective user interface;

determining a length of each of the incidents;

determining a number of each type of incident; and tracking the operability of the respective user interface;

based on the analyzing, resolving the incident by:

prioritizing the incidents in the FCI bucket over the incidents in the DCI bucket;

(a) determining that the software of the respective user interface has defects; and deploying, based on the determination, a new software patch to the respective user interface;

(b) determining if the respective user interface should receive maintenance; and providing, when the respective user interface is determined to receive maintenance, maintenance to the respective user interface, the maintenance further comprising:

ranking each user interface based on the amount of operable respective secondary user interfaces associated with each user interface; and performing maintenance on the user interfaces with a lowest ranking user interface first;

wherein:

the categorizing an incident as a DCI comprises determining that the respective secondary user interfaces exist and at least one of the respective secondary user interfaces is operable during the respective time;

the categorizing the incident as an FCI comprises determining that either the respective secondary user interfaces do not exist or all of the secondary user interfaces are inoperable during the respective time; and the incidents comprises one or more of a jam in the respective user interface, a communication issue with the respective user interface, a host issue with the respective user interface, an encryption issue with the respective user interface, a card reader issue in the respective user interface, a printer issue with the respective user interface, insufficient cash in the respective user interface and a cash depositor is full the respective user interface;

the plurality of user interfaces comprises the automated teller machine ("ATM") and an electronic record of the incident at the teller window.

2. The method of claim 1 wherein the identifying the respective location of each incident comprises:

identifying an identification number of the respective user interface at which the incident occurred; and finding the respective location of the respective user interface associated with the identification number in the lookup table stored in a database.

3. The method of claim 1 wherein the determining the existence of secondary user interfaces at the respective location for each incident comprises looking up the respective location in the lookup table stored in a database to determine whether the respective location is associated with more than one interface.

4. The method of claim 1, the method further comprising resolving the incidents.

5. A system for categorizing a plurality of customer interactions as either a failed customer interaction ("FCI") or a disrupted customer interaction ("DCI"), the system comprising:

a monitor for monitoring customer interaction incidents, the monitor being located at a central location including one or more computer systems;

a receiver for receiving customer interaction incident reports; and a processor, the processor configured to:

monitor the plurality of customer interactions for incidents, each customer interaction taking place at a respective user interface of a plurality of user interfaces;

electronically record the incidents at an autonomous teller machine ("ATM"), the electronic recording generating an incident report;

transmit the incident report to the central location;

analyze the incident report to identify:

a respective location of each incident;

a respective time in which each incident took place;

determine the existence of secondary user interfaces at the respective location for each incident;

determine an operability of each respective secondary user interface during the respective time for each incidents, said determine an operability of the secondary user interface comprising:

parse all incident reports during the respective time to determine whether the secondary user interface has an incident;

determine whether there is any scheduled maintenance being performed on the secondary user interface during the respective time; and determine whether there is any scheduled updates being performed on the secondary user interface during the respective time;

categorize each incident as either a failed customer interaction ("FCI") or a disrupted customer interaction ("DCI");

placing the FCIs into a failed customer interaction bucket;

placing the DCIs into a disrupted customer interaction bucket;

analyze the FCI bucket and the DCI bucket, the analysis comprising:

determining a number of incidents that occur during a specific time period;

determining a number of incidents that occur in the respective user interface;

determining a length of each of the incidents;

determining a number of each type of incident; and tracking the operability of the respective user interface;

based on the analyzing, resolve the incident by:

prioritize the incidents in the FCI bucket over the incidents in the DCI bucket;

(a) determining that the software of the respective user interface has defects; and deploying, based on the determination, a new software patch to the respective user interface;

(b) determining if the respective user interface should receive maintenance; and providing, when the respective user interface is determined to receive maintenance, maintenance to the respective user interface, the maintenance further comprising:

ranking each user interface based on the amount of operable respective secondary user interfaces associated with each user interface; and performing maintenance on the user interfaces with a lowest ranking user interface first;

wherein:

an incident is categorized as a DCI, when it is determined that the respective secondary user interfaces exist and that at least one of the respective secondary user interfaces is operable during the respective time;

an incident is categorized as an FCI, when it is determined that either the respective secondary user interfaces do not exist or all of the secondary user interfaces are inoperable during the respective time;

the incidents comprise one or more of a jam in the respective user interface, a communication issue with the respective user interface, a host issue with the respective user interface, an encryption issue with the respective user interface, a card reader issue in the respective user interface, a printer issue with the respective user interface, insufficient cash in the respective user interface and a cash depositor is full in the respective user interface; and the plurality of customer interactions comprises the automated teller machine ("ATM") and an electronic record of the incident at a teller window.

6. The system of claim 5 wherein to identify the respective location of each incident, the processor is further configured to:

identify an identification number of the respective user interface at which the incident occurred; and find the respective location of the respective user interface associated with the identification number in a lookup table stored in a database.

7. The system of claim 5 wherein to determine the existence of secondary user interfaces at the respective location for each incident, the processor is further configured to look up the respective location in a lookup table stored in a database to determine whether the respective location is associated with more than one user interface.

8. The system of claim 5 wherein the processor is further configured to prompt an administrator to resolve the incidents.

9. The system of claim 8 wherein the processor is configured to prioritize prompting the administrator to resolve the incidents in the failed customer interaction bucket over the incidents in the disrupted customer interaction bucket.

* * * * *